(12) United States Patent
Sukigara et al.

(10) Patent No.: US 8,233,226 B2
(45) Date of Patent: Jul. 31, 2012

(54) CONSTRUCTION OF OBJECTIVE

(75) Inventors: Takuma Sukigara, Ina (JP); Shuhei Horigome, Ina (JP)

(73) Assignee: Olympus Corporation, Tokyo (JP)

( * ) Notice: Subject to any disclaimer, the term of this patent is extended or adjusted under 35 U.S.C. 154(b) by 355 days.

(21) Appl. No.: 12/542,156

(22) Filed: Aug. 17, 2009

(65) Prior Publication Data

US 2010/0053782 A1 Mar. 4, 2010

(30) Foreign Application Priority Data

Sep. 4, 2008 (JP) .................. 2008-227460

(51) Int. Cl.
G02B 7/02 (2006.01)
(52) U.S. Cl. ...................................... 359/819
(58) Field of Classification Search .................. 359/819
See application file for complete search history.

(56) References Cited

U.S. PATENT DOCUMENTS 7,471,473 B2 * 12/2008 Shintani ................. 359/819
2008/0024888 A1 1/2008 Hattori et al.

FOREIGN PATENT DOCUMENTS

| JP | 10-123386 A | 5/1998 |
| JP | 11-344657 A | 12/1999 |
| JP | 2002-244009 A | 8/2002 |
| JP | 2007-298864 A | 11/2007 |
| JP | 2008-15146 A | 1/2008 |

* cited by examiner

Primary Examiner — Joseph P Martinez
(74) Attorney, Agent, or Firm — Holtz, Holtz, Goodman & Chick, PC

(57) ABSTRACT

A construction of an objective is configured which includes a plurality of lens groups including at least one cemented lens group; a plurality of inner frames to hold the lens groups, each including a contact projection; and a tube to hold the plurality of inner frames stacked inside. At least one cemented lens group is secured to the inner frames by causing the periphery of a cemented surface between cemented lenses to come into contact with the contact projection.

13 Claims, 6 Drawing Sheets

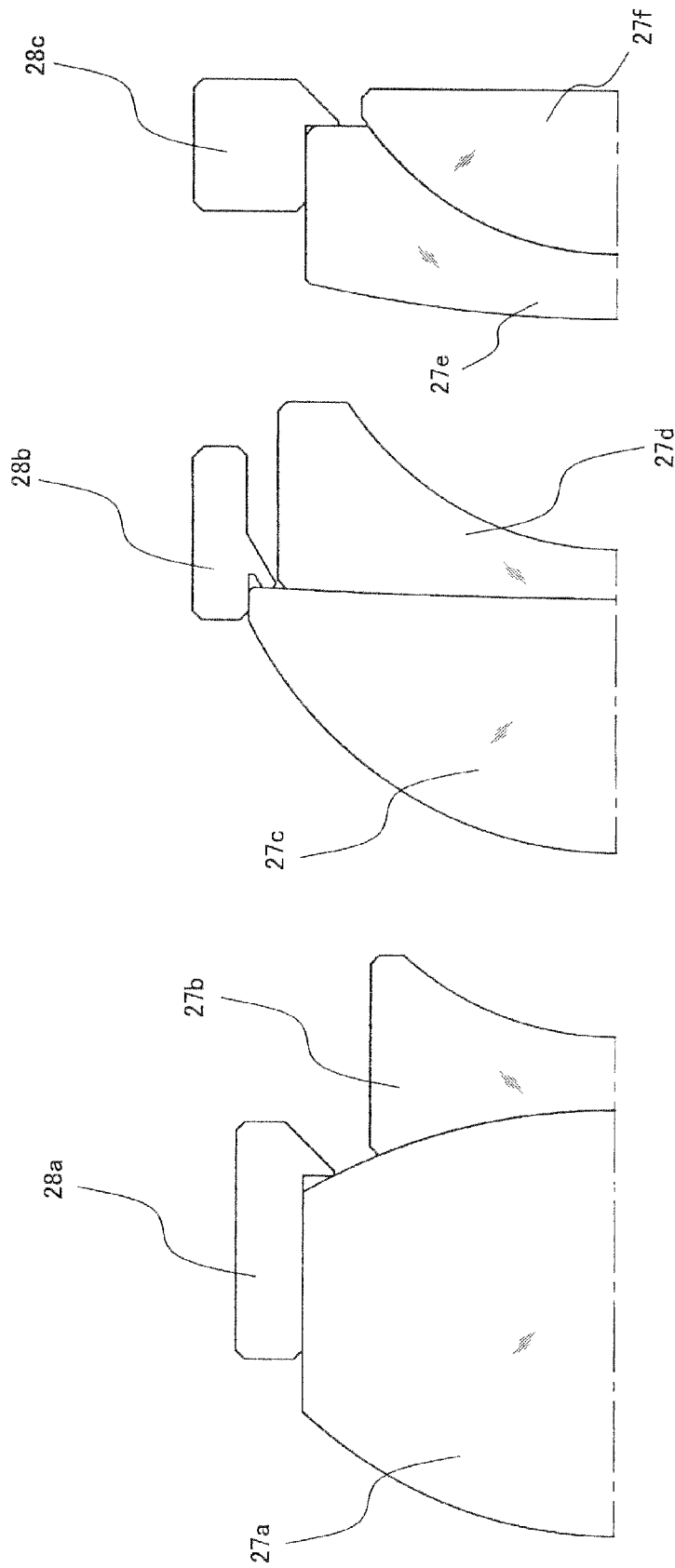

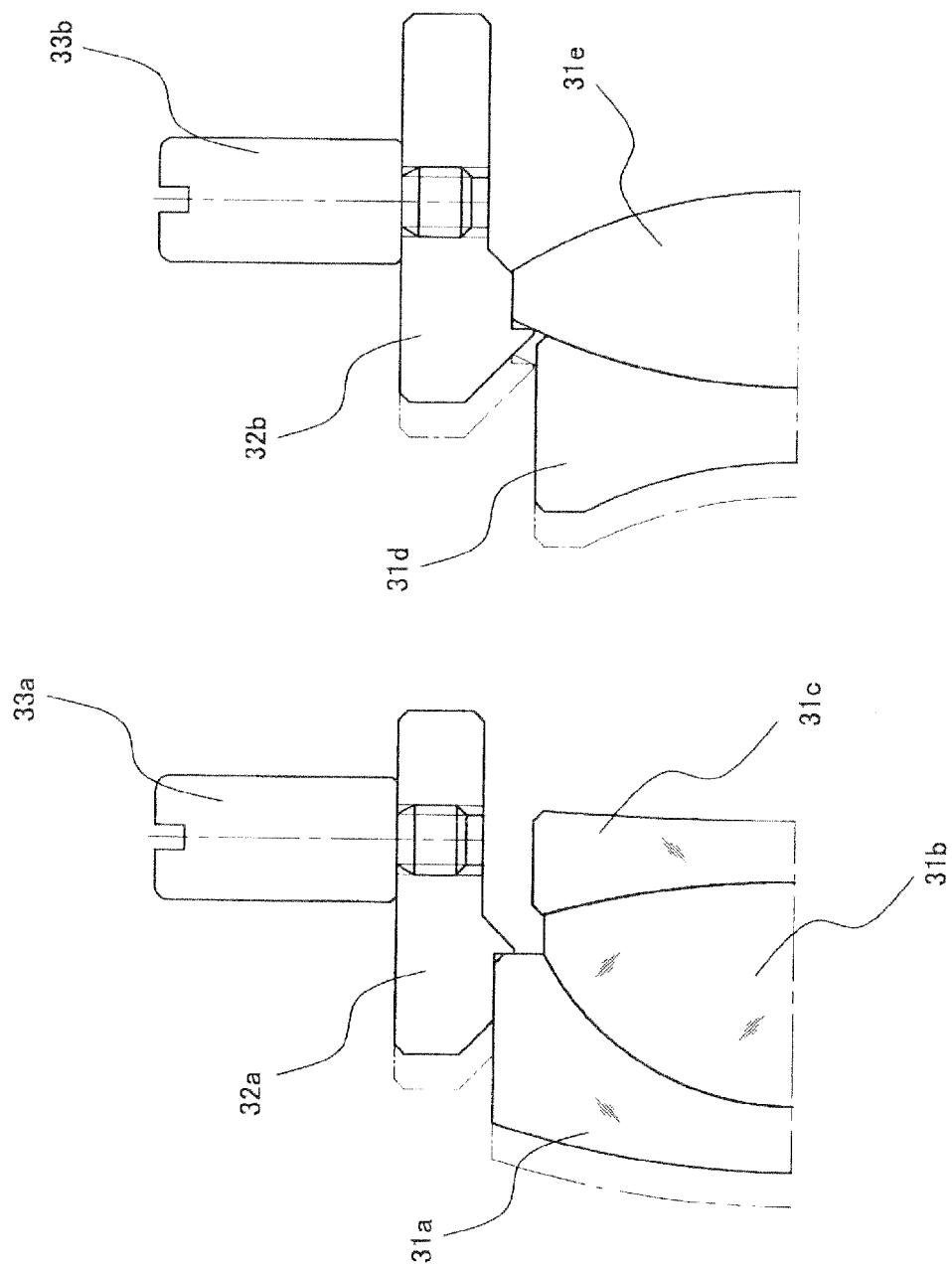

CONSTRUCTION OF OBJECTIVE

CROSS REFERENCE TO RELATED APPLICATIONS

This application claims benefit of Japanese Application No. 2008-227460, filed Sep. 4, 2008, the contents of which are incorporated by this reference.

BACKGROUND OF THE INVENTION

1. Field of the Invention

The embodiments discussed herein are related to a construction of an objective, specifically to a construction for fixing a lens group in a tube with high accuracy.

2. Description of the Related Art

In an optical system which requires a high accuracy lens arrangement such as in an objective of a microscope, an individual lens group is adhered to a lens frame referred to as an inner frame. Then each of the inner frames is fixed in a predetermined position in a tube, and an entire optical system is configured.

Adjustment of the objective during assembly is performed by fine-tuning the position of the inner frame, to which the lens group is adhered, in the tube. Therefore, securing the lens group to the inner frame with high accuracy forms the basis for fixing the lens group in the tube with high accuracy.

When fixing the lens group to the inner frame, the lens group is adhered while monitoring the state of eccentricity of lenses included in the lens group. If the lens group consists of a cemented lens, then one lens is first adhered to the inner frame. Subsequently, remaining lenses are cemented to the lens that is adhered to the inner frame.

Generally in this method, a lens which is closest to an image, or a lens which is closest to an object, is selected as the first lens to be adhered to the inner frame. The first reason for this is to make the inner frame work as a foundation to support the lens group in operation such as assembling and measurement. In other words, the inner frame serves as the lowest layer, and each of the lenses of the cemented lens are cemented to each other in an accumulating manner.

The second reason is that the state of eccentricity may be easily measured. In this method, if the first lens is not adhered with high accuracy, such an error would also impinge on the accuracy of the position of the second and later lenses. Thus, the initial first lens must be adhered with high accuracy when securing the cemented lens to the inner frame. Therefore, it is preferable to initially adhere to the inner frame a lens which is closest to an image or an object and of which the state of eccentricity may be easily measured.

SUMMARY OF THE INVENTION

According to one aspect of the present invention, a construction of an objective includes a plurality of lens groups including at least one cemented lens group; a plurality of inner frames to hold the lens groups, each including a contact projection; and a tube to hold the plurality of inner frames stacked inside, wherein at least one cemented lens group is adhered to the inner frames by causing the periphery of a cemented surface between cemented lenses to come into contact with the contact projection.

BRIEF DESCRIPTION OF THE DRAWINGS

The present invention will be more apparent from the following detailed description when the accompanying drawings are referenced.

FIG. 4A is a diagram illustrating a cross section of a doublet cemented lens group included in an objective of a microscope according to the second embodiment.

FIG. 4B is a diagram illustrating a cross section of the variation of a doublet cemented lens group included in an objective of a microscope according to the second embodiment.

FIG. 4C is a diagram illustrating a cross section of another variation of a doublet cemented lens group included in an objective of a microscope according to the second embodiment.

FIG. 6A is a diagram illustrating a cross section of a movable lens group included in an objective of a microscope according to the fourth embodiment.

FIG. 6B is a diagram illustrating a cross section of the variation of a movable lens group included in an objective of a microscope according to the fourth embodiment.

DESCRIPTION OF THE PREFERRED EMBODIMENTS

First, technical features of the present invention are described.

One feature of the present invention is that, in an objective which includes a plurality of lens groups including a cemented lens group, a plurality of inner frames to hold the lens groups, and a tube to hold the inner frames stacked inside, the cemented lens group is adhered to the inner frame by causing the periphery of a cemented surface of the cemented lens group to come into contact with a contact projection of the inner frame.

Figure 1:
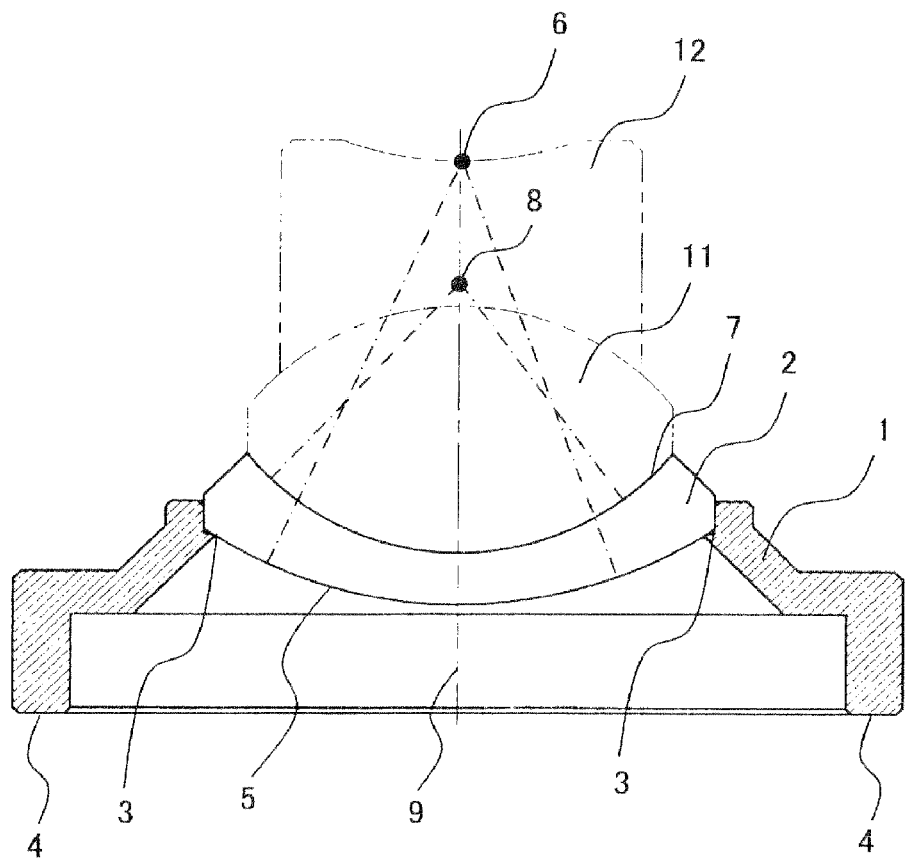
FIG. 1 is a cross-sectional diagram illustrating a method for securing a cemented lens to an inner frame according to the prior art.

Generally, when securing the cemented lens to the inner frame, the cemented lens is positioned by causing a lens which is closest to an image (or an object) to come into contact with the inner frame from the object side (or the image side). FIG. 1 is a cross sectional diagram illustrating the lens group adhered to the inner frame using prior art.

In FIG. 1, a lens 2 is positioned by causing it to come into contact with a contact projection 3 of an inner frame 1. Here, a contact surface 4 between inner frames is located below the lens 2. The contact projection 3 supports the lens 2 from below. In addition, the contact projection 3 is caused to come into contact with a different optical surface than a cemented surface of the lens 2. This kind of configuration is because the eccentricity of the lens 2 may be measured with reference to the contact surface 4.

To measure the state of eccentricity of the lens 2, a position which is referred to as a spherical center is measured. For the lens 2, the spherical center of the first optical surface 5 is a spherical center position 6, and that of the second optical surface 7 is a spherical center position 8. These two spherical center positions 6 and 8 are measured to determine the state of eccentricity of the lens 2 on the basis of the degree of deviation from an optical axis 9 with reference to the contact surface 4.

Based on the measurement result of the state of eccentricity of the lens 2, the eccentricity of the lens 2 is offset. Then, lenses 11 and 12 are cemented while measuring each state of eccentricity in the same manner.

As illustrated in FIG. 1, if the lens 2 is a meniscus lens, the spherical center positions 6 and 8 tend to be positioned close to each other. The lens 2 is held by the contact projection 3. Therefore, even if the lens 2 is moved slightly inside the inner frame, the spherical center position 8 only moves around the spherical center position 6 as a center. As a result, in the case of the meniscus lens in which the spherical center positions 6 and 8 are positioned close to each other, it might be difficult to adjust the state of eccentricity.

Therefore, in each embodiment of the present invention, a lens is adhered to an inner frame by causing a cemented surface (more properly, a portion of the cemented surface where lenses are not caused to come into contact with each other, hereinafter referred to as the periphery of the cemented surface) to come into contact with the inner frame. In this way, first a lens for which eccentricity may be easily adjusted is allowed to be selectively adhered.

Figure 2:
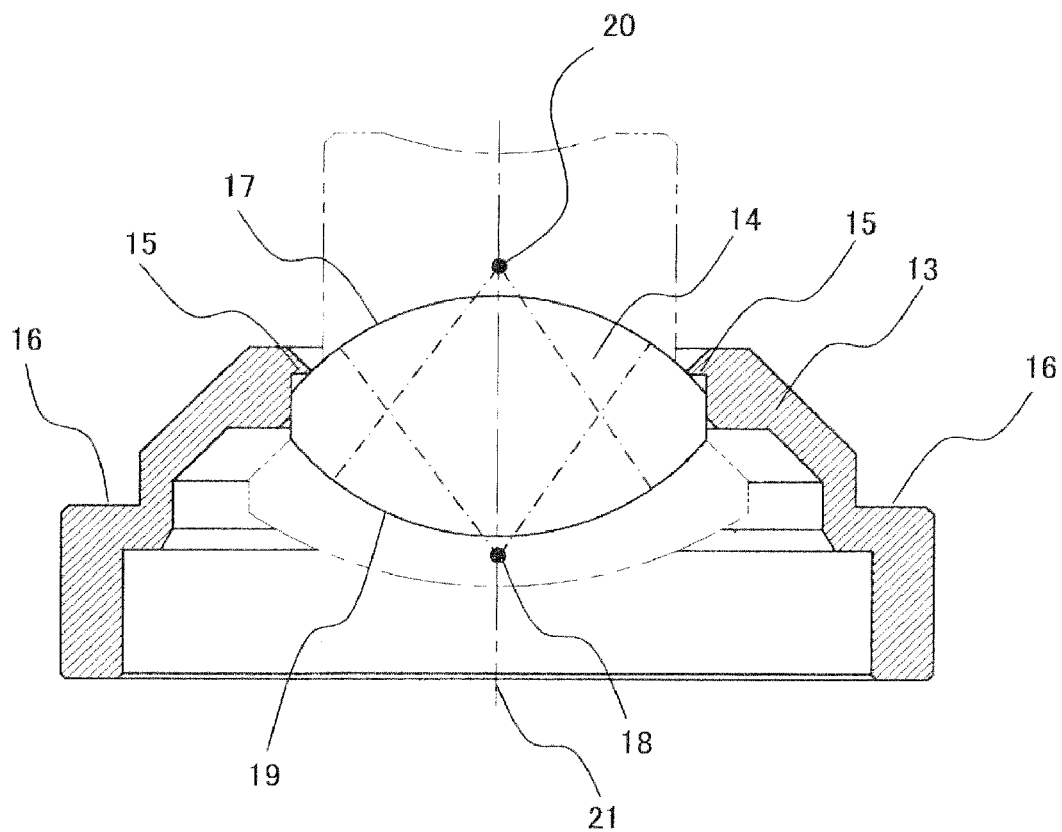
FIG. 2 is a cross-sectional diagram illustrating a method for securing a cemented lens to an inner frame according to one embodiment of the present invention.

FIG. 2 is a cross-sectional diagram of the cemented lens illustrated in FIG. 1, illustrating that the lens is adhered to the inner frame by causing the periphery of the cemented surface to come into contact with the inner frame. As illustrated in FIG. 2, a lens 14 is positioned by causing the cemented surface to come into contact with a contact projection 15 of an inner frame 13. Here, since the contact projection 15 supports the lens 14 from above in FIG. 2, the reference to measure the state of eccentricity is a contact surface 16 between inner frames. As the contact surface 16 is located below the lens 14 in FIG. 2, a jig (not shown) may be used so that the lens 14 and a measuring instrument do not interfere with each other.

As illustrated in FIG. 2, a spherical center position 18 of the first optical surface 17 of the lens 14 is far apart from a spherical center position 20 of the second optical surface 19. Therefore, there is an advantage wherein the deviation from an optical axis 21 may be easily recognized; this is determined by these spherical center positions 18 and 20, and the contact surface 16. Further, when the lens 14 is moved slightly inside the inner frame 13 to offset the eccentricity, the spherical center position 20 makes a relatively large move because it is far apart from the spherical center position 18. Therefore, this kind of configuration may facilitate offsetting of the eccentricity of the lens 14.

The following describes a preferred configuration for the configuration in which the cemented lens is adhered by causing the periphery of the cemented surface of the cemented lens group to come into contact with the contact projection of the inner frame.

First, it is preferable that the cemented surface with which the contact projection of the inner frame comes into contact be a convex surface.

Generally, if the contacting surface is a concave surface, the contact projection may have a special shape. Therefore, this is not preferable because it is troublesome to manufacture the contact projection. In addition, if the cemented surface is a concave surface, there often may not be a periphery of the cemented surface to contact the inner surface.

It is further preferable that the cemented surface with which the contact projection of the inner frame comes into contact is an optical surface of a convex lens.

Generally, in the convex lens, spherical center positions of two optical surfaces are apart from each other. Therefore, the measurement accuracy of the eccentricity may be easily improved. It is further preferable that not only a surface which is to be caused to come into contact with the contact projection, but also an optical surface opposite thereto be a convex surface.

It is further preferable that the cemented surface with which the contact projection of the inner frame comes into contact be an optical surface of a central lens of a triplet cemented lens.

In the case where the triplet cemented lens is fixed to the inner frame, if a lens is cemented starting from a lens is closest to an image (or an object), it may lead to an accumulated error in eccentricity. The configuration in which the central lens of the triplet cemented lens is initially adhered to the inner frame may be preferable so as to inhibit error accumulation in eccentricity.

It is further preferable that the cemented surface with which the contact projection of the inner frame is caused to come into contact be one of two cemented surfaces of the triplet cemented lens, with a lower height of light passing through it.

The triplet cemented lens has two cemented surfaces. The cemented surface with a lower height of light has a larger periphery. Therefore, it is preferable to ensure enough space for coming into contact with the contact projection.

It is also preferable that the cemented surface with which the contact projection of the inner frame is caused to come into contact be a cemented surface between lenses whose outer diameters differ from each other by 10% or greater.

When coming into contact with the periphery of the cemented surface with the inner frame, larger difference between the outer diameters of the lenses to be cemented may allow larger spaces where contact is made with the contact projection.

It is also preferable that the cemented lens group having a cemented surface with which the contact projection of the inner frame is caused to come into contact be a cemented lens group in which the height of light incident on the incident end and that of light emitted from the exit end differ from each other by 10% or greater.

Generally, an outer diameter of a lens depends on the height of light. Therefore, in the case of the cemented lens having a large difference between the outer diameters of lenses, the height of light incident on the incident end and that of light emitted from the exit end may significantly differ from each other.

It is also preferable that the cemented lens group having the cemented surface with which the contact projection of the inner frame is caused to come into contact be one of two lens groups with concave surfaces facing each other.

In many optical systems, including a microscope, the height of light is lowered by the optical surface that has the concave surfaces facing each other in order to correct an aberration such as field curvature. As a result, the height of light may change significantly in front and back of this lens group having the concave surfaces facing each other. Therefore, the space for coming into contact with the contact projection of the inner frame may be easily ensured in such a lens group.

It is also preferable that the cemented lens group having a cemented surface with which the contact projection of the inner frame is caused to come into contact be a movable group.

In the vicinity of the movable group, components such as a cam and a spring are located to control the movement adequately. Therefore, location of the inner frame is also restricted in the vicinity of the movable group. The configuration in which the cemented surface is adhered by being caused to come into contact with the contact projection of the inner frame may allow the size of the inner frame to be kept small. Thus, such a situation may be easily addressed.

Hereinafter, each embodiment of the present invention is described.

EMBODIMENT 1

Figure 3:
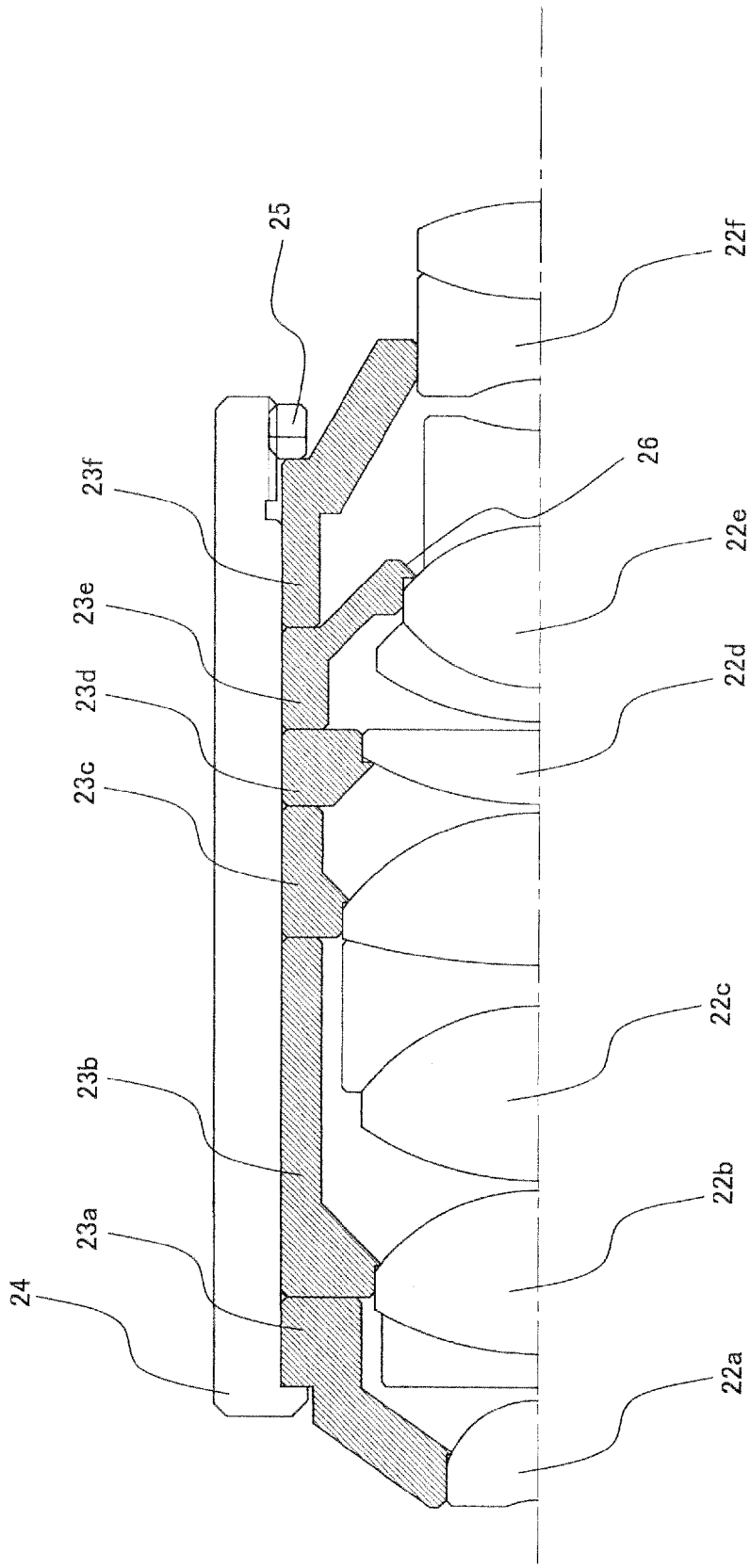
FIG. 3 is a diagram illustrating a cross section of an objective of a microscope according to the first embodiment.

FIG. 3 is a diagram illustrating a cross section of an objective of a microscope according to the present embodiment. As illustrated in FIG. 3, lens groups 22a, 22b, 22c, 22d, 22e, and 22f of the objective according to the present embodiment are adhered to inner frames by causing the periphery of each lens group to come into contact with inner frames 23a, 23b, 23c, 23d, 23e, and 23f, respectively. Further, the inner frames 23a, 23b, 23c, 23d, 23e, and 23f are held by being stacked inside a tube 24. At this time, a press ring 25 operates to apply pressure to the entire inner frames as described above from the side of an abutting joint of the objective. In this way, the inner frames 23a, 23b, 23c, 23d, 23e, and 23f may be firmly fixed in the tube 24.

In this embodiment, the lens group 22e is adhered to the inner frame 23e by causing the periphery of the cemented surface to come into contact with the contact projection 26 of the inner frame 23e. The lens group 22e is a triplet cemented lens. The lens which is caused to come into contact with the contact projection 26 of the inner frame 23e is a central convex lens. The surface which is caused to come into contact with the contact projection 26 of the inner frame 23e is a convex surface.

This lens group 22e constitutes a so-called Gauss type lens combined with the lens group 22f. The lens groups 22e and 22f are located with concave surfaces facing each other, and lower a height of light. Therefore, for the lens group 22e, the height of light incident on the incident end and that of light emitted from the exit end may significantly differ from each other. This is also indicated by the fact that the outer diameters of the incident end lens and the outgoing end lens of the lens group 22e significantly differ from each other.

Further, in the lens group 22e, the cemented surface with which the contact projection 26 of the inner frame 23e comes into contact is one of two cemented surfaces of the triplet cemented lens with a lower height of light passing through it.

EMBODIMENT 2

FIGS. 4A, 4B, and 4C are diagrams each illustrating a cross section of a doublet cemented lens group included in an objective of a microscope according to the present embodiment. In FIGS. 4A to 4C, examples are illustrated where the doublet cemented lens is adhered to the inner frame.

FIG. 4A illustrates an example where the doublet cemented lens consisting of a convex lens 27a and a concave lens 27b is adhered to an inner frame 28a. A contact projection of the inner frame 28a is caused to come into contact with the periphery of a cemented surface between the convex lens 27a and the concave lens 27b. Here, the cemented surface with which the contact projection of the inner frame 28a is caused to come into contact is a convex surface of the convex lens 27a.

FIG. 4B illustrates an example where a doublet cemented lens consisting of meniscus lenses 27c and 27d is adhered to an inner frame 28b. A contact projection of the inner frame 28b is caused to come into contact with the periphery of a cemented surface between the meniscus lenses 27c and 27d. Here, the cemented surface with which the contact projection of the inner frame 28b is caused to come into contact is a concave surface of the meniscus lens 27c.

FIG. 4C illustrates an example where a doublet cemented lens consisting of a meniscus lens 27e and a convex lens 27f is adhered to an inner frame 28c. A contact projection of the inner frame 28c is caused to come into contact with the periphery of a cemented surface between the meniscus lens 27e and the convex lens 27f. Here, the cemented surface with which the contact projection of the inner frame 28c is caused to come into contact is a plane surface of the meniscus lens 27e. In this way, the curvature radius of the periphery may differ from that of the portion of contact between lenses in the cemented surface.

EMBODIMENT 3

Figures 5A, 5B:
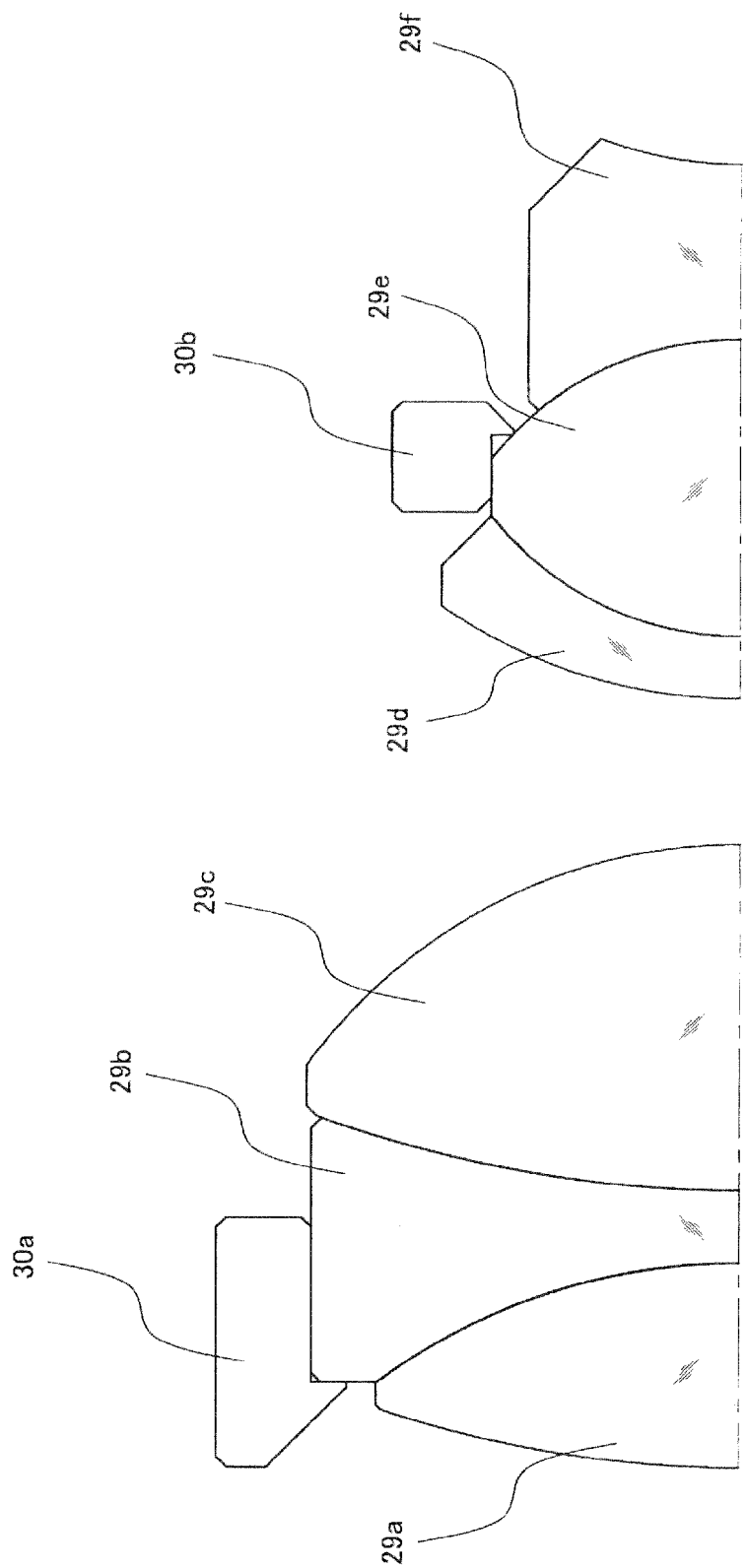
FIG. 5A is a diagram illustrating a cross section of a triplet cemented lens group included in an objective of a microscope according to the third embodiment.
FIG. 5B is a diagram illustrating a cross section of the variation of a triplet cemented lens group included in an objective of a microscope according to the third embodiment.

FIGS. 5A and 5B are diagrams each illustrating a cross section of a triplet cemented lens group included in an objective of a microscope according to the present embodiment. Here, FIGS. 5A and 5B illustrate examples where the triplet cemented lens group is adhered to the inner frame.

FIG. 5A illustrates an example where a triplet lens group consisting of a convex lens 29a, a concave lens 29b, and a convex lens 29c is adhered to an inner frame 30a. A contact projection of the inner frame 30a is caused to come into contact with the periphery of a cemented surface between the convex lens 29a and the concave lens 29b. Here, the periphery of the cemented surface with which the contact projection of the inner frame 30a is caused to come into contact is a plane surface of the convex lens 29b. In this way, the curvature radius of the periphery may differ from that of the portion of contact between lenses in the cemented surface.

FIG. 5B illustrates an example where a triplet cemented lens consisting of a meniscus lens 29d, a convex lens 29e, and a concave lens 29f is adhered to an inner frame 30b. A contact projection of the inner frame 30b is caused to come into contact with the periphery of a cemented surface between the convex lens 29e and the concave lens 29f. Here, the cemented surface with which the contact projection of the inner frame 30b is caused to come into contact is a convex surface of the convex lens 29e.

EMBODIMENT 4

FIGS. 6A and 6B are diagram each illustrating a cross section of a movable group included in an objective of a microscope according to the present embodiment. Here, FIGS. 6A and 6B illustrate examples where the movable lens group is adhered to the inner frame.

FIG. 6A illustrates an example where a movable lens group which is a triplet cemented lens consisting of a meniscus lens 31a, a convex lens 31b, and a concave lens 31c is adhered to an inner frame 32a. The inner frame 32a is provided with a cam pin 33a which is engaged with a cam (not shown). The movable lens group is moved by rotation of this cam. The contact projection of the inner frame 32a is caused to come into contact with the periphery of a cemented surface between the meniscus lens 31a and the convex lens 31b. The periphery of the cemented surface with which the contact projection of the inner frame 32a is caused to come into contact is a plane surface of the meniscus lens 31a. In this way, the curvature radius of the periphery may differ from that of the portion of contact between lenses in the cemented surface.

FIG. 6B illustrates an example where a movable lens group which is a doublet cemented lens consisting of a concave lens 31d and a convex lens 31e is adhered to an inner frame 32b. The inner frame 32b is provided with a cam pin 33b which is engaged with a cam (not shown). The movable lens group is moved by rotation of this cam. The contact projection of the inner frame 32b is caused to come into contact with the periphery of a cemented surface between the concave lens 31d and the convex lens 31e. The cemented surface with which the contact projection of the inner frame 32b is caused to come into contact is a convex surface of the convex lens 31e.

What is claimed is:

1. A construction of an objective, comprising:
    a plurality of lens groups including at least one cemented lens group;
    a plurality of inner frames to hold the lens groups, each including a contact projection; and
    a tube to hold the plurality of inner frames stacked inside;
    wherein a periphery of a cemented surface of the cemented lens group is caused to come into contact with a respective one of the contact projections, so that the cemented lens group is adhered to the corresponding inner frame in such a manner that an eccentricity of the cemented lens group is offset.

2. The construction of the objective according to claim 1, wherein the periphery is a portion of the cemented surface where lenses which constitute the cemented surface are not in contact with each other.

3. The construction of the objective according to claim 1, wherein the cemented surface is a convex surface.

4. The construction of the objective according to claim 3, wherein the cemented surface is an optical surface of a convex lens.

5. The construction of the objective according to claim 4, wherein the cemented surface is an optical surface of a central lens of a triplet cemented lens.

6. The construction of the objective according to claim 5, wherein the cemented surface is one of two cemented surfaces of a triplet cemented lens, with a lower height of light passing therethrough.

7. The construction of the objective according to claim 1, wherein the cemented surface is a cemented surface between two lenses having outer diameters which differ from each other by at least 10%.

8. The construction of the objective according to claim 1, wherein the cemented surface has a curvature radius of the periphery different from that of a portion of contact between lenses which constitute the cemented surface.

9. The construction of the objective according to claim 1, wherein the cemented lens group is a cemented lens group in which a height of light incident on an incident end and a height of light emitted from an exit end differ from each other by at least 10%.

10. The construction of the objective according to claim 1, wherein the cemented lens group is one of two lens groups with concave surfaces facing each other.

11. The construction of the objective according to claim 1, wherein the cemented lens group is a movable lens group.

12. The construction of the objective according to claim 1, wherein:
    outer diameters of the plurality of inner frames are substantially identical with an inner diameter of the tube; and
    the tube holds the plurality of inner frames stacked inside, the plurality of inner frames being inserted from a side of an abutting joint.

13. The construction of an objective according to claim 1, wherein the construction of the objective is adapted for use in a microscope.

* * * * *